United States Patent [19]

Hammer et al.

[11] Patent Number: 5,370,914
[45] Date of Patent: Dec. 6, 1994

[54] TUBULAR FOOD CASING WITH IMPROVED PEELABILITY

[75] Inventors: Klaus-Dieter Hammer, Mainz-Mombach; Manfred Siebrecht; Hermann Winter, both of Wiesbaden, all of Germany

[73] Assignee: Hoechst Aktiengesellschaft, Frankfurt am Main, Germany

[21] Appl. No.: 846,071

[22] Filed: Mar. 5, 1992

[30] Foreign Application Priority Data

Mar. 7, 1991 [DE] Germany .............................. 4107239

[51] Int. Cl.$^5$ ...................... F16L 11/00; A22C 13/00
[52] U.S. Cl. ................................. 428/34.8; 138/118.1; 426/105; 426/135
[58] Field of Search ................. 428/34.8; 138/118.1; 426/105, 135; 264/186, 187

[56] References Cited

U.S. PATENT DOCUMENTS

| | | | |
|---|---|---|---|
| 2,136,566 | 11/1938 | Schneco et al. | 18/57 |
| 2,813,034 | 11/1957 | Weingard et al. | 426/105 |
| 2,901,358 | 8/1959 | Underwood et al. | 99/176 |
| 2,925,621 | 2/1960 | Parth | 18/57 |
| 2,988,451 | 6/1961 | Zahn | 426/140 |
| 3,123,483 | 3/1964 | McKnight | 426/140 |
| 3,451,827 | 6/1969 | Bridgeford | 99/176 |
| 3,494,773 | 2/1970 | Courts et al. | 99/176 |
| 3,679,435 | 7/1972 | Klenk et al. | 99/176 |
| 3,988,804 | 11/1976 | Regner et al. | 17/45 |
| 4,029,727 | 6/1977 | Austin et al. | 264/186 |
| 4,357,371 | 11/1982 | Heinrich et al. | 427/238 |
| 4,378,017 | 3/1983 | Kosugi et al. | 424/35 |
| 4,396,039 | 8/1983 | Klenk et al. | 138/118.1 |
| 4,410,011 | 10/1983 | Andra et al. | 138/118.1 |
| 4,543,282 | 9/1985 | Hammer et al. | 428/34.8 |
| 4,562,110 | 12/1985 | Tong | 264/186 |
| 4,563,376 | 1/1986 | Hammer et al. | 428/34.8 |
| 4,666,750 | 5/1987 | Hammer et al. | 426/105 |
| 4,670,273 | 6/1987 | Hammer et al. | 426/105 |
| 5,089,307 | 2/1992 | Ninomiya et al. | 428/35.2 |
| 5,096,754 | 3/1992 | Hammer et al. | 426/105 |

FOREIGN PATENT DOCUMENTS

| | | |
|---|---|---|
| 2801038 | 7/1979 | Germany . |
| 3447026 | 7/1985 | Germany . |
| 1201830 | 8/1970 | United Kingdom . |

Primary Examiner—Ellis P. Robinson
Assistant Examiner—Rena L. Dye
Attorney, Agent, or Firm—Foley & Lardner

[57] ABSTRACT

A tubular food casing, particularly sausage casing, wherein the inner surface of a sausage casing based on cellulose, is provided with a coating comprising alginates, alginic acid, chitosans, or a combination of these active substances, is distinguished by improved peelability.

20 Claims, No Drawings

TUBULAR FOOD CASING WITH IMPROVED PEELABILITY

BACKGROUND OF THE INVENTION

The present invention relates to a tubular food casing which on its inner surface has a coating for improving the peelability of the casing from its contents, and to the use of said food casing. In particular, the invention is directed to peel-off casings which are suitable for frankfurter-type sausages and other scalded sausages and give good results on automated high-speed peelers. It has been found that the inner coating preparations for the above mentioned food casings are also suitable for other small-diameter and ring casings, such as those employed for smoked finely minced ham sausages and coarse spreadable sausages.

Casings of the above generic type are known, for example, from EP-A-109,611. The inner surfaces of the casings described are provided with a coating comprising a mixture of a water-soluble cellulose ether, a wax, and an oil. The inner coating of a casing of the same generic type, which is known from DE-A-34 47 026, comprises, in addition to a chromium/fatty acid complex compound and a dialkylpolysiloxane, also cellulose ether and wax. However, all known preparations used for improving the peelability of casings are of relatively complicated composition and are not yet fully satisfactory, in particular when being stuffed with relatively problematic goods.

Summary of the Invention

It was therefore the object of the present invention to provide a food casing which is internally coated with a coating composition comprising as few individual components as possible, but which nevertheless offers a wide application range in respect of easy peelability from goods of various compositions.

It is also an object of to provide a process for producing a food casing.

Another object of the invention is to provide an emulsion which can be used to coat the inner surface of a food casing so as to improve the peelability of the casing from its contents.

In accomplishing the foregoing objectives, there has been provided, in accordance with one aspect of the invention, a tubular food casing comprising cellulose, wherein the inner surface of said casing is provided with a coating which improves the peelability of the casing from its contents, the coating comprising an active substance selected from at least one of the group consisting of alginates, alginic acid, and chitosans.

In accordance with another aspect of the present invention there is provided a process for making the above food casing which comprises the step of coating a casing comprising cellulose with an aqueous solution comprising about 0.5 to about 4.0% by weight of the active substance based on the total weight of the solution so as to produce a casing comprising about 5 to about 100 mg/m² of the active substance based on the dry weight of the food casing.

In accordance with another object of the present invention there is provided a coating emulsion comprising at least one substance selected from the group consisting of alginates, alginic acid, and chitosan.

Further objects, features, and advantages of the present invention will become apparent from the detailed description of preferred embodiments that follows.

DETAILED DESCRIPTION OF THE PREFERRED EMBODIMENTS

The food casing of this invention preferably is a synthetic sausage casing, in particular a sausage casing which need not be watered, and which is suitable for the smoking, cooking, and automatic peeling of small scalded sausages. The special coating applied to the inner surface of the casing leads to a reduced adhesion between the inner casing wall and the stuffing compositions typically employed for small-diameter and medium-diameter straight or ring casings. The stuffing is particularly sausage meat for small scalded sausages, such as frankfurters, but may also include various types of unsmoked or smoked; cooked such as mortadella, yellow skin sausage, and ham sausage; or uncooked, such as spreadable pork sausage minced sausage compositions; whereby curved or ring-type casings without fiber reinforcement are preferably used for the latter type of sausage.

The base material for the support tubing is cellulose. Any type of cellulose may be used including transparent cellulose film, regenerated cellulose, and cellulose hydrate. The casing may be produced in any manner and is preferably produced as a seamless tubing in the customary manner by coagulation and regeneration, preferably from a viscose solution. It is also possible to employ tubings having a glued seam, which are obtained by folding a web and joining the edges, such as described in EP-A-50,702 and EP-A-0,058,240. If the casing is used for producing large-diameter cooked sausages, a fiber-reinforced cellulose support tubing is preferably used. The reinforcement may, for example, be a paper web which is incorporated in the tubing wall. For producing curved or ring-shaped sausages, such as uncooked sausages or particularly coarse spreadable sausages, curved tubings or so-called ring casings are preferably used, which are preferably not fiber reinforced. The curvature is obtained, for example, during the production of the tubing, but other known processes can be used such as disclosed in US-2,136,566; US-2,925,621; US-3,679,435, and EP-A--50,702.

The food casing can be stuffed with the goods to be packed therein in any known manner, preferably in the laid-flat state. It is, however, also possible to use the casings as shirred tubings, so-called concertinas, which are produced by means of customary shirring devices, as is disclosed in U.S. Pat. No. 3,988,804.

It has been found that the inner coating of this invention not only results in a reduced adhesion between the inner casing wall and the sausage meat but that additional advantages are achieved with regard to winding, storing, shirring, and further processing. Due to the inner coating, the tubing walls of wound-up casings do not stick together. Cut-to-size tubing sections do not stick together even when they are stored over a relatively long period, and they can be opened without problem prior to being stuffed with sausage meat, in particular on automatic stuffing devices. Furthermore, the tubings are distinguished by particularly good sliding properties and softness and can therefore be shirred without problem.

In accordance with this invention, the coating contains alginates, alginic acid, and/or chitosans. They can be used in any combination and in any amount so long as the inventive results, such as improved peelability, are obtained. Alginates are salts of alginic acid, in particular the alkali metal and alkaline earth metal salts thereof. Alginic acid itself is a colorless carboxyl group-containing polysaccharide having a mean molecular weight of between 100,000 and 240,000. Chemically, alginic acid is composed of 1,4-glycosidically linked D-mannuronic acid units, with occasional sections of alpha-glycosidically linked L-guluronic acid units. Alginic acid is a natural product which is present in brown algae in considerable amounts.

Chitosans are a group of compounds derived from naturally occurring chitin. They are obtained by desacetylation and partial depolymerization of chitin with the aid of strong alkalis. Chemically, they are B-glycosidically linked poly-N-acetyl glucosamines whose acetyl groups are hydrolysed to a greater or lesser extent as a result of the action of the strong alkalis. The chitosans generally have a mean molecular weight of about 400,000.

In accordance with the invention, the total applied amount of the hydrophilic active substance, i.e., alginate, alginic acid, chitosan, or any combination thereof, is preferably in the range of 5 to 100 mg/m$^2$, more preferably in the range of 10 to 70 mg/m$^2$, relative to the dry weight of the casing. The coating nay be done in any known manner, and is preferably performed from an aqueous coating composition where the concentration of the active substances is in the range of 0.5 to 4.0% by weight, preferably of 1 to 3% by weight, relative to the total weight of the solution.

The coating composition of the casing according to this invention preferably contains further additives, such as slip agents, shirring aids, and/or release agents. Examples for such additives, in particular, include a broad variety of diverse oils, e.g., natural oils, such as olive oil or rape oil, or synthetic mono-, di- or triglycerides, paraffin oils, silicone oils and/or waxes. Acid waxes based on crude montan wax are preferred waxes. They are, for example, commercially available from Hoechst AG under the trade name HOECHST WACHS, Types E, X 22, F, KP 301, KPS, KSL, KSS, KST, KFO, U, BJ or RT. Preference is given to Type KPS, which is an ethane diol ester of montan acid. The additives are present in the aqueous coating composition in any suitable amount, preferably of 0.5 to 30% by weight, more preferably of 1 to 5% by weight, relative to the total weight of the aqueous solution.

Furthermore, customary emulsifiers, such as alkyl sulfonates, alkylaryl sulfonates, alkyl sulfates, alkylaryl sulfates or non-ionogenic emulsifiers, such as ethoxylated alcohols or amines may be added for emulsifying the additives.

Monofatty acid esters or polyhydric alcohols, such as sorbitol monoesters or alkane diols, e.g.-, 1,2-propane diol, can also be used as emulisifiers. The emulsifiers are preferably added in amounts of 5 to 50% by weight, relative to the weight of the coating solution. Unexpectedly, it was discovered that the alkane diols, most preferably 1,2-propane diol, have an additional stabilizing effect on the casings, in particular on shirred casings (concertinas), and very particularly on casings made from a relatively labile basic material.

Coating solutions which apart from alginate, alginic acid and/or chitosan contain an oil and a wax have been found to be particularly suitable for peel-off sausage casings.

The food casing according to this invention is produced employing one of the processes customarily used for the production of food casings, in particular sausage casings, which are based on cellulose and can be easily peeled off from their contents, particularly sausage meat.

The coating is applied to the inner surface of the tubular casing in any known manner, for example, by filling the tubular casing with coating liquid, such as described in GB-A-1,201,830, U.S. Pat. No. 2,901,358, DE-A-28 01 038, and DE-C-30 12 250, or by spraying the coating liquid into the tubular casing during the shirring process, e.g., through the hollow shirring mandrel as described in US-3,451,827. The coating temperature in general corresponds to the ambient temperature, i.e., it is between about 15 and 30° C.

If the tubular casing is filled with the coating liquid, it is expedient to carry out this step during the production of the tubular casing, e.g., after the precipitation of the cellulose hydrate gel from viscose and prior to the drying step.

Tubular casings produced in accordance with this invention, which, in accordance with their intended use, are stuffed with sausage meat, and are then scalded and smoked, can be peeled off from their contents without any problem, using automatic peelers. The coating of this invention has found to be suitable for practical use both in the case of non-reinforced cellulose casings and in the case of fiber-reinforced cellulose casings.

The invention will be illustrated in greater detail by means of the non-limiting examples which follow.

EXAMPLE 1

20 pbw (parts by weight) of Na-alginate (®Protacell 20, available from Protan GmbH, Norderstedt, Germany) were dissolved in 925 pbw of water with agitating. 30 pbw of a 50% strength synthetic glyceride mixture (®Softenol, available from Dynamit Nobel) and 25 pbw of a 20% strength wax emulsion (KPS Wachs, available from Hoechst AG, Gersthofen, Germany) were added to the resulting solution.

The coating composition thus obtained was filled into a peelable gel tubing having a diameter of 23 mm, and the tubing was then dried in the inflated state, remoistened and shirred to give concertinas. The concertinas were stuffed with sausage meat, cooked, smoked and peeled-off automatically. All casings could be removed without any problem, no gel deposition was observed.

Example 2

A coating composition was prepared from:
900 pbw: of water
20 pbw (2.0%): of Na-alginate (®Protacell 20)
30 pbw (1.5%): of ®Softenol emulsion (50% strength)
50 pbw (1.0%): of KPS wax emulsion (20% strength).

A ring casing having a diameter of 43 nun was internally coated with the resulting coating composition as described in Example 1. The casings could be peeled off from coarse spreadable sausage without any problem.

EXAMPLE 3

A coating composition was prepared from:
885 pbw: of water
30 pbw (3.0%): of Na-alginate (®Protacell 20)
60 pbw (3.0%): of ®Softenol emulsion (50% strength)

25 pbw (0.5%): of KPS wax emulsion (20% strength).

The inner surface of a fiber-reinforced casing having a diameter of 60 m was coated with the resulting coating composition as described in Example 1. The sausage casing obtained in this way could be peeled off from smoked scalded sausages without any problem.

Example 4

A coating composition was prepared from:
930 pbw: of water
20 pbw (2.0%): of Chitosan (®Sea-Cure 110 L, from Protan GmbH, Norderstedt, Germany)
30 pbw (1.5%): of ®Softenol emulsion (50% strength)
25 pbw (0.5%): of KPS wax emulsion (20% strength).

The coating composition thus obtained was used for internally coating a small-size gel tubing having a diameter of 38 mm, as described in Example 1. The casing could be readily peeled off from smoked ham sausage.

Example 5

A coating composition was prepared from:
910 pbw; of water
30 pbw (3.0%): of chitosan (®Sea-Cure 110 L)
60 pbw (30%): of ®Softenol (50% strength).

The coating composition obtained in this way was used for internally coating a ring casing having a diameter of 43 mm, as described in Example 1. The casing could be easily peeled off from coarse spreadable sausage.

EXAMPLE 6

A coating composition was prepared from:
700 pbw: of water
20 pbw (2.0%): of Na-alginate (®Protacell 20) 30 pbw (1.5%): of ®Softenol emulsion (50% strength) 25 pbw (0.5%): of KPS wax emulsion (20% strength) 25 pbw (22 .5): of 1,2-propane diol.

The coating composition obtained in this way was used for internally coating a peel-off casing having a diameter of 21 mm, as described in Example 1. The shirred casings were distinguished by increased stability, the resulting sausages exhibited excellent peelability.

EXAMPLE 7

A coating composition was prepared from:
832 pbw: of water
20 pbw (2.0%): of chitosan (®Sea-Cure 110 L)
30 pbw (1.5%): of ®Softenol emulsion (50% strength)
25 pbw (0.5%): of KPS wax emulsion (20% strength)
93 pbw (9.3%): of 1,2-propane diol.

The coating composition obtained in this way was used for internally coating a peel-off casing having a diameter of 40 mm, as described in Example 1. The shirred casings were distinguished by increased stability, and they could be easily peeled off from smoked ham sausage.

EXAMPLE 8

A coating composition was prepared from:
879 pbw: of water
20 pbw (2.0%): of chitosan (®Sea-Cure 110 L)
30 pbw (1.5%): of ®Softenol emulsion (50% strength)
25 pbw (0.5%): of KPS wax emulsion (20% strength)
46 pbw (4.6%): of 1,2-propane diol.

The coating composition obtained in this way was used for internally coating a peel-off casing having a diameter of 23 mm, as described in Example 1. The shirred casings were distinguished by increased stability, and they could be easily peeled off from frankfurter-type sausages.

What is claimed is:

1. A tubular food casing comprising cellulose, wherein the inner surface of said casing is provided with a coating which improves the peelability of the casing from its contents, said coating comprising an active substance selected from at least one of the group consisting of alginates, alginic acid, and chitosans, wherein the casing comprises about 5 to about 100 mg of said substance per square meter of said food casing
with proviso that if the active substance is solely an alginate, the coating additionally comprises at least one additive selected from the group consisting of olive oil, rape oil, synthetic mono-, di- or triglycerides, paraffin oils, silicone oils, and waxes.

2. A tubular food casing as claimed in claim 1, wherein said casing is a casing for uncooked spreadable sausages, smoked cooked sausages, or unsmoked cooked sausages.

3. A tubular food casing as claimed in claim 1, wherein said cellulose is selected from the group consisting of transparent cellulose film, regenerated cellulose, cellulose hydrate, and mixtures thereof.

4. A food casing as claimed in claim 1, wherein the cellulose is produced in the form of a seamless tubing, by coagulation and regeneration from a viscose solution.

5. A tubular food casing as claimed in claim 1, wherein said casing comprises a fiber reinforcement.

6. A tubular food casing as claimed in claim 1, wherein said substance comprises an alginate which is selected from the group consisting of alkali metal and alkaline earth metal salts of alginic acid.

7. A tubular food casing as claimed in claim 1, wherein said substance comprises said alginic acid.

8. A tubular food casing as claimed in claim 1, wherein said substance comprises a chitosan.

9. A tubular food casing as claimed in claim 1, comprising about 10 to about 70 mg/m² of said substance.

10. A tubular food casing as claimed in claim 1, wherein said additive is applied to said inner surface from an aqueous coating composition comprising about 0.5 to about 4.0% by weight of said substance, based on the weight of said coating composition.

11. A tubular food casing as claimed in claim 1, wherein said coating additionally comprises at least one additive selected from the group consisting of olive oil, rape oil, synthetic mono-, di- or triglycerides, paraffin oils, silicone oils, and waxes.

12. A tubular food casing as claimed in claim 11, wherein said coating comprises both an oil and a wax.

13. A tubular food casing as claimed in claim 12, wherein said coating additionally comprises an alkane diol.

14. A tubular food casing as claimed in claim 13, wherein said alkane diol is 1,2,-propane diol.

15. A tubular food casing as claimed in claim 1, wherein said coating comprises an alginate, a wax, and an oil.

16. A tubular food casing as claimed in claim 1, wherein said coating comprises alginic acid, a wax, and an oil.

17. A tubular food casing as claimed in claim 1, wherein said coating comprises chitosan, a wax, and an oil.

18. A tubular food casing as claimed in claim 15, wherein said coating additionally comprises an alkane diol.

19. A tubular food casing as claimed in claim 16, wherein said coating additionally comprises an alkane diol.

20. A tubular food casing as claimed in claim 17, wherein said coating additionally comprises an alkane diol.

* * * * *